United States Patent [19]

Clark

[11] 4,001,436

[45] Jan. 4, 1977

[54] BEVERAGES

[75] Inventor: John Clark, St. Michael, Barbados

[73] Assignee: Banks Barbados Breweries Limited, Bridgetown, Barbados

[22] Filed: July 25, 1975

[21] Appl. No.: 599,033

[30] Foreign Application Priority Data

Aug. 3, 1974 United Kingdom ............ 34293/74

[52] U.S. Cl. .................................. 426/29; 426/72; 426/74; 426/477; 426/598

[51] Int. Cl.$^2$ ...................... A23L 2/00; C02D 1/00

[58] Field of Search ................ 426/48, 64, 28, 29, 426/72, 590, 474, 74, 533, 650; 195/31 P, 31 F, 31 R; 127/41; 424/180, 153, 280

[56] References Cited

UNITED STATES PATENTS

| | | | |
|---|---|---|---|
| 1,227,184 | 5/1917 | Neidlinger | 426/28 |
| 3,525,626 | 8/1970 | Swaine et al. | 426/590 |
| 3,598,609 | 8/1971 | Hoynak | 426/590 |
| 3,734,742 | 5/1973 | Morse et al. | 426/72 |

OTHER PUBLICATIONS

Underkofler et al. "Enzymes in the Starch Industry" Die Starke No. 6 1965 pp. 179–184.

*Primary Examiner*—R. B. Penland
*Attorney, Agent, or Firm*—Strauch, Nolan, Neale, Nies & Kurz

[57] ABSTRACT

A carbonated soft drink includes fructose, a malt extract in which maltose has been converted into glucose and a flavoring essence which may include kola nut extract.

15 Claims, No Drawings

BEVERAGES

Prior Application: Priority, Great Britain Aug. 3, 1974 Application No. 34293/74.

This invention is concerned with improvements in or relating to beverages.

It is an object of the invention to provide a novel refreshing beverage in a modern idiom.

The invention provides a method of producing a carbonated soft drink comprising the steps of (a) procuring a sugar solution containing glucose and fructose, (b) procuring an aqueous malt extract, (c) converting maltose in the malt extract into glucose, and (d) mixing the sugar solution with the converted malt extract.

The invention also provides a carbonated soft drink produced by a method according to the invention.

The invention also provides a carbonated soft drink comprising (a) fructose, (b) a malt extract in which maltose has been converted into glucose, and (c) a flavouring essence.

The flavouring essence may comprise for example one or more of the following flavours: orange, blackcurrant, cherry, guava, sorrel, soursop, honey and redcurrant. Preferably the essence comprises kola nut extract with honey and redcurrant essences.

Preferably the soft drink comprises at least 5% by weight fructose, and has a pH of at least 4.0.

The sugar solution comprising glucose and fructose is for example obtained by conversion of sucrose in a solution of cane sugar or beet sugar, or alternatively may be obtained by conversion of glucose in corn (maize) syrup.

There now follows a description of a beverage embodying the invention and its production. This description is given by way of example only, and not by way of limitation of the invention.

The beverage embodying the invention is a non-alcoholic carbonated soft drink comprising a synergetic mixture of a malt extract in which maltose has been converted to glucose, and a sugar solution in which sucrose has been converted to glucose and fructose.

The beverage contains an artificial flavouring essence comprising a pre-mixed blend of kola nut extract with honey and redcurrant essences; added sodium and potassium salts; added Vitamin C; Vitamin B; and amino-acids and phosphates.

One typical approximate analysis of the beverage now follows:

| Glucose | | | 17 | g |
|---|---|---|---|---|
| Fructose | | | 15.5 | g |
| Sodium | | | 114 | mg |
| Potassium | | | 48 | mg |
| Phosphorous | - organic | 13 | | |
| | - inorganic | 35 | 48 | mg |
| Vitamin C | | | 30 | mg |
| Amino Nitrogen | | | 15 | mg |
| Vitamin B | - Thiamin (B$^1$) | 62 | | |
| | - Riboflavin (B$^2$) | 23 | | |
| | - Pyridoxin (B$^6$) | 17 | | |
| | - Niacin | 148 | | |
| | - Cyanocobalamin (B$^{12}$) | trace | 250 | mcgm |
| pH | | | 4.0 | |
| Gravity | | | 1045° | |

In the production of the beverage embodying the invention, a required sugar solution is produced by converting sucrose into glucose and fructose by boiling after addition of phosphoric acid; together with addition of sodium and potassium chloride. A required aqueous malt extract is produced by mashing malted barley in water and, by malt action, converting starch into inter alia maltose, with protein breakdown into amino acids. A commercial amyloglucosidase enzyme (preferably derived from a species of the mould Aspergillus) is used to convert maltose into glucose. The sugar solution and malt extract are then mixed, filtered and carbonated with the addition of further ingredients as will be described.

A commercial enzyme is an enzyme which has been produced industrially (e.g. by fermentation) suitably formulated for use in industrial processes. The enzyme per se may be used for example supported by a solid diluent or in the form of a solution.

Preferably the volume of the converted sugar solution is between 100 to 120 U.S. gallons per 100 lbs. of original sugar; the volume of the converted malt extract is between 70 and 90 U.S. gallons per 100 lbs. of original method barley; and the converted sugar solution is mixed with the converted malt extract in the ratio of about 3 volumes of converted sugar solution to 1 volume of converted malt extract.

Preferably the phosphoric acid is used in a concentration equivalent to between 0.1 to 0.15 liters of 1.75 specific gravity phosphoric acid per 100 gallons of sugar solution treated therewith.

The malt action is carried out in at least two temperature stages, the first preferably between 110° and 130° F primarily for proteolysis and the second preferably between 130° and 150° F primarily for conversion of starch to maltose.

The amyloglucosidase action is preferably carried out at a temperature between 120° and 140° F.

One method of producing the beverage embodying the invention will now be described in more detail.

Sugar Solution 2,100 lbs. of cane sugar were dissolved in Barbados spring water and pumped to a stirred and heated cooker vessel. 40 lbs. of sodium chloride and 5 lbs. of potassium chloride were then added. The solution was brought to 2,500 U.S. gallons at a gravity of 1040.8° (water = 1000°); the solution was brought to the boil. 3 liters of 1.75 specific gravity phosphoric acid were then added and the solution boiled gently for 1 hour to convert sucrose to glucose and fructose. 2,400 U.S. gallons were then transferred to another vessel where the solution was allowed to stand for 15 minutes. The solution was then cooled without aeration to yield 2,250 U.S. gallons at a gravity of 1045°.

Malt Extract 1,200 lbs of 6-Row malted barley and 2,800 lbs. of 2-Row malted barley were mashed in Barbados spring water at 120° F. 18 lbs. of Burton Sales was added to adjust the water hardness and the mash stirred for 1 minute, followed by standing for 20 minutes. The temperature was then raised to 142° F followed by standing at this temperature for 10 minutes. The temperature was then further raised to 156° F with stirring every 15 minutes until starch converion to sugars was completed.

The mash was then transferred to a lauter vessel for clarification from solids, the lauter vessel having been pre-cooled by the introduction of cold water. The mash was allowed to stand in the lauter vessel for 10 minutes and then circulated until clear and substantially free of solids. The clear wort was then transferred to another heated vessel and 110 lbs. of Ambazyme PC 25 was added with stirring at an early stage in the filling of the heated vessel. Ambazyme PC 25 is a solid amyloglucosidase enzyme having an activity of 25 AG units per gram, marketed by A.B.M. Chemicals Limited, Stockport, England. For a definition of A.G. units attention is directed to U.K. Patent Specification No. 1,183,772 of A.B.M. Industrial Products Limited. The temperature was carefully controlled at 131° F for 4 hours by adding sparging water with stirring every 15 minutes. 3,500 U.S. gallons of malt extract was collected at a gravity of 1043.2°, allowed to stand for 4 hours and then boiled gently for 1 hour. The final yield was 3,300 U.S. gallons at a gravity of 1046.0°. The malt extract was then allowed to stand for 15 minutes followed by cooling without aeration to 38°–42° F.

| Mixing of Sugar Solution and Malt Extract. | |
|---|---|
| Sugar Solution | 4,500 U.S. gallons |
| Malt Extract | 1,500 U.S. gallons |

The above quantities were mixed followed by stirring for ½ hour and cold storage for at least 48 hours to allow cooling and cold break precipitation of protein.

The mixture was then roughly filtered through a diatomaceous earth filter using Messrs. Johns-Manville's of Denver, Colorado, U.S.A. Celite 545 filter aid for body feed. The mixture was carbonated with $CO_2$ to a level of 2.3 volumes (NTP) $CO_2$ per volume of liquid. The mixture was dosed throughout filtration with: 1lb. of Messrs. Schwarz Services International's of Mount Vernon, N.Y., U.S.A. Protesal proteolytic enzyme for shelf-life purposes; 1lb. of potassium metabisulphite as an anti-oxidant; 2 gallons of Messrs. White Stevenson's of Reigate, England Essence SN/09; and 1lb. of Goldenol which is a colouring material also of Messrs. White Stevenson, to bring the mixture approximately to the colour of honey.

Essence SN/09 is an artificial flavouring essence having the following composition by weight:

| Kola nut extract (unflavoured) | 1 part |
|---|---|
| Honey A.M. | 2 parts |
| Redcurrant No. 1 | 3 parts |

Rough filtration was followed by fine filtration again through a diatomaceous earth filter using Messrs. JohnsManville's Hyflo Supercel filter aid for body feed. The mixture was carbonated to 2.9 volumes (NTP) $CO_2$ per volume of liquid. The mixture was dosed throughout filtration with 151lbs. of ascorbic acid (Vitamin C).

Bottling

The product was bottled with pasteurisation at 160° F.

The product was found to be a tangy, refreshing drink having excellent properties as to thirst quenching, restoration of energy and stimulation of physical activity. It is believed to have many properties in common with honey.

What is claimed is:

1. A method of producing a soft drink product comprising the steps of (a) procuring a sugar solution containing glucose and fructose, (b) mashing malted grain in water, (c) allowing malt action in the mash to convert starch into maltose with protein breakdown into amino acids, (d) converting the maltose into glucose to provide a converted aqueous malt extract, and (e) mixing the sugar solution with the converted malt extract.

2. A method of producing a carbonated soft drink comprising the steps of (a) procuring a sugar solution containing sucrose, (b) converting sucrose in the solution into glucose and fructose, (c) mashing malted barley in water, (d) allowing malt action in the mash to convert starch into maltose with protein breakdown into amino acids, (e) converting the maltose into glucose to provide a converted aqueous malt extract, (f) mixing the converted sugar solution with the converted malt extract, (g) carbonating the mixture; and (h) adding a flavouring essence and Vitamin C.

3. A method according to claim 2, wherein the flavouring essence comprises kola nut extract with honey and redcurrant essences.

4. A method according to claim 2, wherein the maltose is converted by the action of a commercial amyloglucosidase enzyme derived from a species of the mould Aspergillus.

5. A method of producing a carbonated soft drink comprising the steps of (a) dissolving cane sugar in water with the addition of sodium and potassium chlorides, (b) converting sucrose in the solution into glucose and fructose by the action of phosphoric acid, the volume of the converted solution being between 100 and 120 U.S. gallons per 100 lbs. of original cane sugar, (c) mashing malted barley in water, (d) allowing malt action in the mash to convert starch into maltose with protein breakdown into amino acids, (e) clarifying the mash from solids, (f) converting the maltose into glucose by the action of a commercial amyloglucosidase enzyme to provide a converted aqueous malt extract, the volume of the converted malt extract being between 70 and 90 U.S. gallons per 100 lbs. of original malted barley, (g) mixing the converted sugar solution with the converted malt extract in the ratio of about 3 volumes of converted sugar solution to 1 volume of converted malt extract, (h) adding to the mixture ascorbic acid and a flavouring essence comprising kola nut extract with honey and redcurrant essences, and (i) carbonating the mixture.

6. A method according to claim 2, wherein the flavoring essence comprises orange or redcurrant.

7. A carbonated soft drink comprising (a) glucose and fructose obtained by conversion of sucrose, (b) an aqueous malt extract in which maltose has been converted into glucose, and (c) a flavoring essence: the concentrations of the glucose/fructose and the malt extract corresponding to a mixture of about 3 volumes of converted sucrose solution to 1 volume of converted malt extract, when the specific volume of said converted sucrose solution is between 100 and 120 U.S. gallons per 100 lbs. of original sucrose and the specific volume of said converted malt extract is between 70 and 90 U.S. gallons per 100 lbs. of original malted grain.

8. A soft drink according to claim 7, wherein the flavouring essence comprises kola nut extract with honey and redcurrant essences.

9. A soft drink according to claim 7, comprising at least 5% by weight fructose.

10. A soft drink according to claim 7, wherein the pH of the drink is at least 4.0.

11. A carbonated soft drink comprising (a) glucose and fructose obtained by conversion of sucrose, (b) an aqueous malt extract in which maltose has been converted into glucose, (c) a flavoring essence, and (d) added Vitamin C: the concentrations of the glucose/fructose and the malt extract corresponding to a mixture of about 3 volumes of converted sucrose solution to 1 volume of converted malt extract, when the specific volume of said converted sucrose solution is between 100 and 120 U.S. gallons per 100 lbs. of original sucrose and the specific volume of said converted malt extract is between 70 and 90 U.S. gallons per 100 lbs. of original malted grain.

12. A carbonated soft drink comprising (a) glucose and fructose obtained by conversion of sucrose, (b) an aqueous barley malt extract in which maltose has been converted into glucose, (c) a flavoring essence, (d) added sodium and potassium chlorides, and (e) added Vitamin C: the concentrations of the glucose/fructose and the malt extract corresponding to a mixture of about 3 volumes of converted sucrose solution to 1 volume of converted malt extract, when the specific volume of said converted sucrose solution is between 100 and 120 U.S. gallons per 100 lbs. of original sucrose and the specific volume of said converted malt extract is between 70 and 90 U.S. gallons per 100 lbs. of original malted barley.

13. A carbonated soft drink comprising (a) glucose and fructose obtained by conversion of sucrose, (b) a malt extract in which maltose has been converted into glucose, (c) a flavoring essence comprising kola nut extract with honey and redcurrant essences, (d) added sodium and potassium chlorides, and (e) added Vitamin C, the soft drink having the following approximate analysis:

| Glucose | | 17 | g |
|---|---|---|---|
| Fructose | | 15.5 | g |
| Sodium | | 114 | mg |
| Potassium | | 48 | mg |
| Phosphorous | - organic 13 | | |
| | - inorganic 35 | 48 | mg |
| Vitamin C | | 30 | mg |
| Amino Nitrogen | | 15 | mg |
| Vitamin B | - Thiamin (B¹) | 62 | |
| | - Riboflavin (B²) | 23 | |
| | - Pyridoxin (B⁶) | 17 | |
| | - Niacin | 148 | |
| | - Cyanocobalamin (B¹²) | trace 250 | mcgm |
| pH | | 4.0 | |
| Gravity | | 1045°. | —. |

14. A carbonated soft drink comprising (a) an aqueous malt extract in which maltose has been converted into glucose, (b) further glucose, (c) fructose, (d) a flavoring essence, (e) added sodium and potassium chlorides, and (f) added Vitamin C, the soft drink having the following approximate analysis:

| Glucose | | 17 | g |
|---|---|---|---|
| Fructose | | 15.5 | g |
| Sodium | | 114 | mg |
| Potassium | | 48 | mg |
| Phosphorous | - organic 13 | | |
| | - inorganic 35 | 48 | mg |
| Vitamin C | | 30 | mg |
| Amino Nitrogen | | 15 | mg |
| Vitamin B | - Thiamin (B¹) | 62 | |
| | - Riboflavin (B²) | 23 | |
| | - Pyridoxin (B⁶) | 17 | |
| | - Niacin | 148 | |
| | - Cyanocobalamin (B¹²) | trace 250 | mcgm |
| pH | | 4.0 | |
| Gravity | | 1045°. | —. |

15. A soft drink according to claim 7 wherein the flavoring essence comprises orange or redcurrant essences.

* * * * *